United States Patent [19]

Re

[11] Patent Number: 4,628,775

[45] Date of Patent: Dec. 16, 1986

[54] VACUUM MODULATOR CONTROL FOR AUTOMATIC TRANSMISSION OF RACING CARS

[75] Inventor: Ronale Re, Newark, Del.

[73] Assignee: Tran-Saver, Inc., Cleveland, Ohio

[21] Appl. No.: 660,079

[22] Filed: Oct. 12, 1984

Related U.S. Application Data

[63] Continuation-in-part of Ser. No. 625,701, Jun. 28, 1984.

[51] Int. Cl.⁴ .......... B60K 41/06

[52] U.S. Cl. .......... 74/863; 74/856; 74/877

[58] Field of Search .......... 74/843, 856, 863, 868, 74/877; 137/DIG. 8, 494, 498; 251/117

[56] References Cited

U.S. PATENT DOCUMENTS

| | | | |
|---|---|---|---|
| 2,547,377 | 4/1951 | De Juhasz | 137/496 |
| 3,097,665 | 7/1963 | Gauldie | 137/494 |
| 3,500,705 | 3/1970 | Forster | 74/863 |
| 3,827,315 | 8/1974 | Lupo | 74/863 |
| 3,882,739 | 5/1975 | Eltze | 74/863 X |
| 3,941,016 | 3/1976 | Will | 74/868 X |
| 4,041,810 | 8/1977 | Harmon et al. | 74/868 |
| 4,374,785 | 2/1983 | Wyatt | 251/117 |
| 4,438,049 | 3/1984 | Ammons | 251/117 |

*Primary Examiner*—Kenneth J. Dorner
*Assistant Examiner*—Dwight G. Diehl
*Attorney, Agent, or Firm*—Connolly and Hutz

[57] ABSTRACT

A vacuum modulator control for automatic transmission racing cars includes a cylinder having one port communicating with the motor vacuum and the other port going to the vacuum line to the transmission. An adjustable knob adjusts the vacuum to a fixed amount regardless of the transmission gear.

5 Claims, 6 Drawing Figures

VACUUM MODULATOR CONTROL FOR AUTOMATIC TRANSMISSION OF RACING CARS

CROSS-REFERENCE TO RELATED APPLICATION

This application is a continuation-in-part of parent application Ser. No. 625,701 filed June 28, 1984.

BACKGROUND OF THE INVENTION

Parent application Ser. No. 625,701 filed June 28, 1984 relates to a an adjustable fully automatic vacuum modulator control for use in vehicles having automatic transmissions with a vacuum modulator. The invention of the parent application is particularly concerned with providing economy of operation by providing automatic control in accordance with the transmission gear.

SUMMARY OF THE INVENTION

The present invention is directed to race car usage where economy is not as important a consideration as is performance.

An object of this invention, therefore, is to provide a vacuum modulator control which maximizes the performance so as to be particularly adaptable to race car usage.

In accordance with this invention a cylinder is provided having a pair of ports. One port communicates with the motor vacuum and the other port communicates with the vacuum modulator line and transmission. An adjustable control device is provided to communicate with the cylinder to adjust the vacuum. Once the vacuum has been adjusted, it remains at that setting regardless of the transmission gear. In this manner, time is not lost when shifting from one gear to another.

THE DRAWINGS

DETAILED DESCRIPTION

Figure 1:
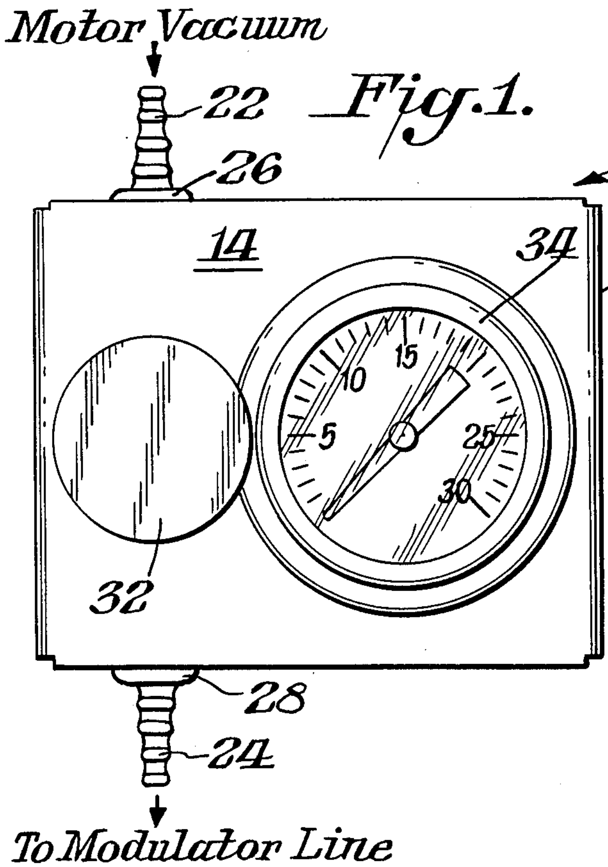
FIG. 1 is a top plan view of a vacuum modulator control in accordance with this invention.
Figure 2:
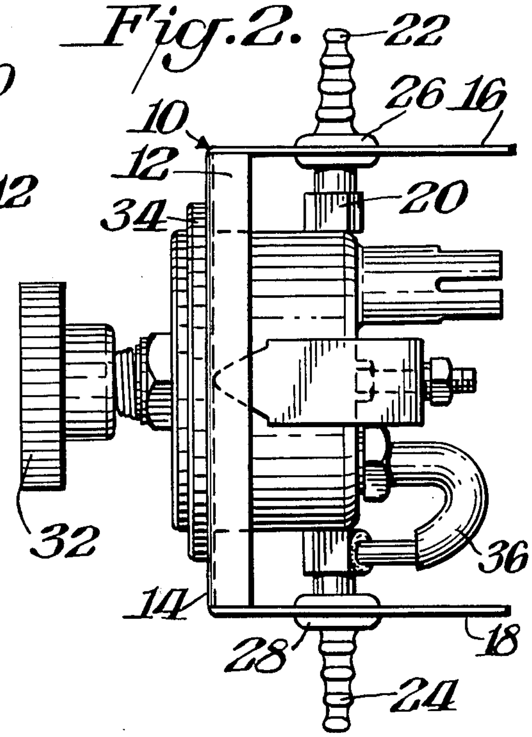
FIG. 2 is an end elevation view of the vacuum modulator control of FIG. 1 with a portion of the housing removed.
Figure 3:
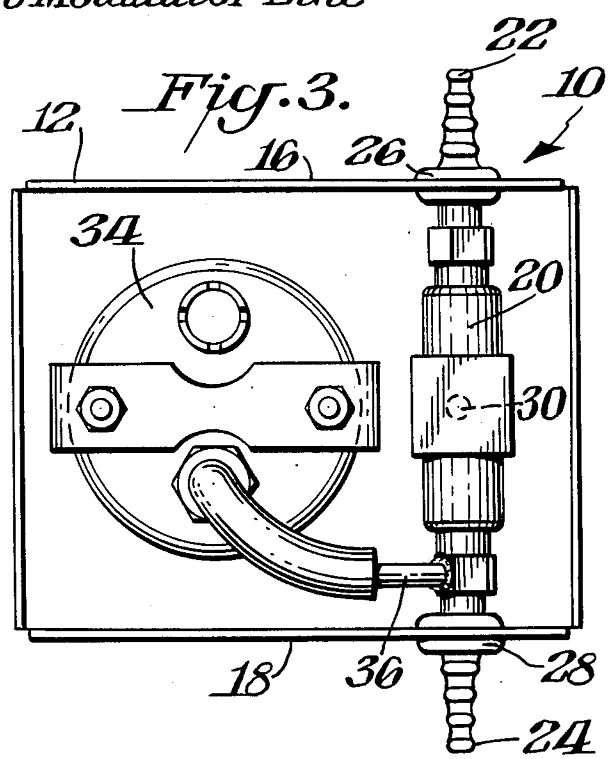
FIG. 3 is a bottom plan view of the vacuum modulator control of FIGS. 1-2 with a portion of the housing removed.

FIGS. 1-3 illustrate a vacuum modulator control 10 which is particularly designed to improve the performance of automatic transmissions having vacuum modulators as used in high performance racing competition. Vacuum modulator control 10 permits a wide range of adjustment which makes it universally adaptable to any automatic transmission having a vacuum modulator. Control 10 has certain similarities to the type of device illustrated in parent application Ser. No. 625,701, the details of which are incorporated herein by reference thereto but the difference is that the present invention is concerned primarily with high performance automobiles whereas the parent application is primarily concerned with economy and efficiency. With the present invention a single adjustment is made to the desired setting for obtaining the best possible performance. Once the adjustment is made, the setting remains constant regardless of the shifting from one gear to another.

By incorporating control 10 between the vacuum source from the engine and the vacuum modulator line of the transmission and by adjusting to a lower amount of vacuum to the transmission vacuum modulator, an increase in oil pressure results in the transmission. Normal transmission operates between 17 and 20 inches of vacuum during normal operations. Control 10, however, permits an improvement in the performance of the transmission by adjusting the vacuum flow to a range between 10 to 6 inches of vacuum, depending on the type of car and transmission. It has been found that this range would provide the area of variable adjustment to maximize performance. Of course, other ranges can be used.

Figure 6:
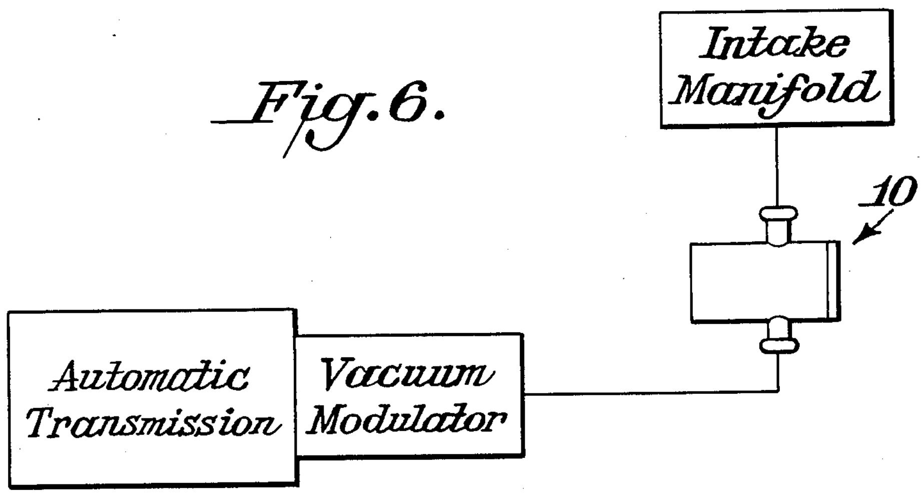
FIG. 6 is a schematic showing of the vacuum modulator control of FIGS. 1-5 mounted between the vacuum modulator and intake manifold of a vehicle.

FIG. 6 schematically illustrates control 10 being mounted by the intake manifold and vacuum modulator of a vehicle.

As shown in FIGS. 1-3, control 10 includes a housing 12 having a front face 14 with a pair of opposite depending side walls 16, 18. A U-shaped wall, not shown, would provide the rear and other side walls of housing 12. The U-shaped wall is omitted for the sake of clarity.

As best shown in FIG. 3, control 10 includes a cylinder 20 which has a pair of ports 22, 24 extending through side walls 16, 18, respectively. Ports 22, 24 extend through gasket 26, 28 in side wall 16, 18. Port 22 communicates with the motor vacuum while port 24 communicates with the modulator line.

Figure 4:
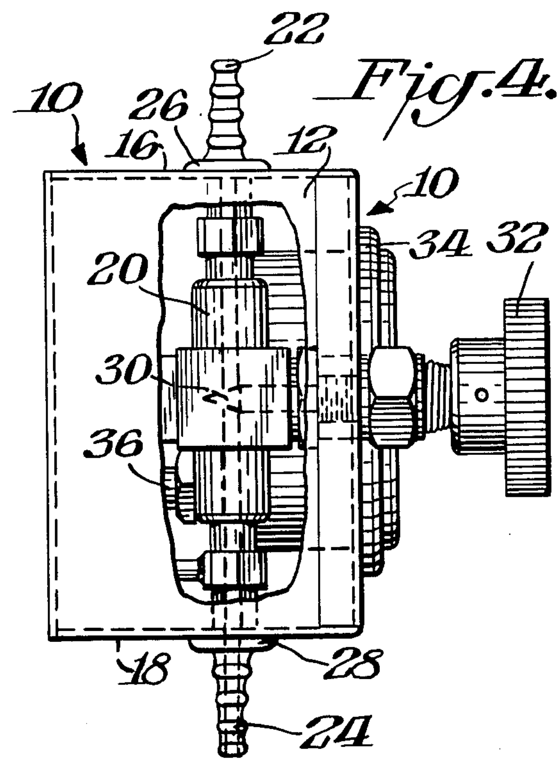
FIG. 4 is an end elevation view similar to FIG. 2 but from the opposite end thereof.

As best shown in FIG. 4, a valve 30 is provided in cylinder 20. Valve 30 may be of any suitable construction and preferably is a needle valve. The extent of valving action is controlled by rotation of knob 32 which is thereby adjustable to control the vacuum going to the transmission.

Control 10 also includes a vacuum gauge 34 as best shown in FIG. 1 to give a visual indication of the vacuum to the transmission. This reading of vacuum is obtained by providing a tube 36 which communicates with cylinder 20 and extends to the underside of gauge 34. The gauge may be of conventional construction and thus it is not necessary to describe the details thereof. A vacuum reading is taken from the transmission side, not the motor to give an absolute true vacuum reading of the transmission.

Control 10 provides a number of distinct advantages. For examplė, control 10 permits raising the shift points. Additionally control 10 gives a more positive shift. Control 10 permits the development of maximum horse power at the rear wheels on each shift due to the shift times being sped up. Doing this prevents the rpm's from being reduced between the shifts, which in turn develops maximum horse power at the rear wheels on shift.

Figure 5:
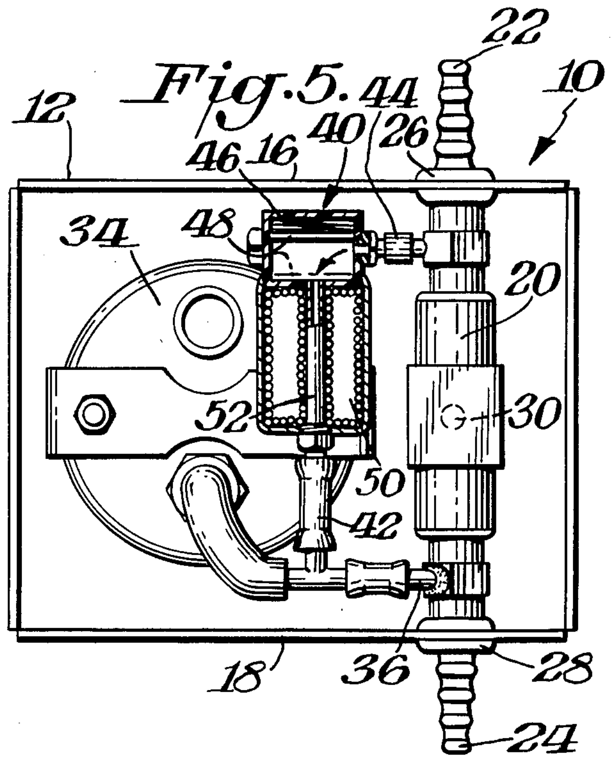
FIG. 5 is a bottom plan view of a modified form of this invention.

FIG. 5 shows a modified form of control 10. In this form a suitable by-pass valve such as electrically operated solenoid valve 40 is connected by line 42 to tube 36 and by line 44 to cylinder 20. As shown, valve 40 would include a spring 46 biasing valve head 48 closed. The user, however, could electrically energize coil 50 around rod 52 to open the valve during normal road usage. This permits the user to rely on valve 30 during racing competition or, alternatively, to rely on valve 40 during normal road use where economy is a more important consideration. For example, during racing competition valve 40 would be closed and only valve 30 would be operative. In normal use both valves would be operative.

What is claimed is:

1. In a multi-speed automatic transmission for race competition vehicles having transmission gears to shift from low to high to low in response to the acceleration and deceleration of the racing vehicle wherein a vacuum modulator control is mounted between a vacuum modulator and an intake manifold, the improvement being said vacuum modulator control comprising a cylinder, a first port communicating with and extending away from said cylinder and communicating with the motor vacuum, a second port communicating with and extending away from said cylinder and communicating with the vacuum modulator line, adjustable valve means in said cylinder for controlling the amount of vacuum going to the transmission, said adjustable valve means including externally located adjusting means for controlling the adjustment of said valve means, a vacuum gauge for visually indicating the amount of vacuum actually going to the transmission, said vacuum gauge communicating with said cylinder on the transmission side thereof as distinct from the motor side to provide an absolute vacuum reading to the transmission, a by-pass valve being in selective communication with said cylinder for being operative during normal road usage and in an inactive condition during racing competition, a tube communicating with said cylinder between said second port and said valve means, said gauge communicating with said tube to permit said absolute vacuum reading from said gauge, a by-pass line communicating with said tube and communicating with said cylinder between said first port and said valve means, said by-pass valve being located for operation in said by-pass line, and said valve means being at least partially open during all conditions of use with said by-pass valve being selectively open and selectively closed.

2. The vacuum modulator control of claim 1 wherein said vacuum gauge communicates with said cylinder by means of a tubing which is connected to said cylinder adjacent said second port.

3. The vacuum modulator control of claim 2 wherein said externally located adjusting means comprises an adjustable knob, said valve means being a needle valve mounted for movement in response to the rotation of said knob.

4. The vacuum modulator of claim 3 wherein the vacuum flow is in the range of 10 to 6 inches.

5. The vacuum modulator of claim 3 wherein said by-pass valve is an electrically operated solenoid valve, tube means communicating with said cylinder on each side of said needle valve, said solenoid valve being mounted in said tube means, resilient means biasing said solenoid valve to a closed position, and said tube means including said tubing which communicates with said vacuum gauge.

* * * * *